United States Patent [19]

Nelson

[11] 4,160,733
[45] Jul. 10, 1979

[54] MARINE ENGINE COOLING WATER FILTER CLEANING SYSTEM

[76] Inventor: Duane A. Nelson, 1313 Maple St., Neenah, Wis. 54956

[21] Appl. No.: 875,443

[22] Filed: Feb. 6, 1978

[51] Int. Cl.² .................... B01D 35/14; B01D 35/16; B01D 29/38
[52] U.S. Cl. .................................. 210/85; 210/108; 210/139; 210/143; 210/411; 123/41.05
[58] Field of Search ................ 210/85, 108, 138, 143, 210/411, 427, 333 R, 175, 139; 123/41.05, 41.09; 114/198; 134/166 C

[56] References Cited

U.S. PATENT DOCUMENTS

| | | | |
|---|---|---|---|
| 3,581,895 | 6/1971 | Howard et al. | 210/108 |
| 3,864,260 | 2/1975 | Banner | 210/108 |
| 4,061,571 | 12/1977 | Banner | 210/130 |

Primary Examiner—Charles N. Hart
Assistant Examiner—David R. Sadowski
Attorney, Agent, or Firm—Peter P. Kozak

[57] ABSTRACT

The invention pertains to an engine installation using marine water as a coolant and having an intake conduit system for drawing marine water to the engine including a strainer at the inlet and a filter between the strainer and the water pump. To clean the filter and strainer which periodically becomes clogged with foreign matter while the engine is operating, a valve mechanism is provided between the filter and the water pump which is operative to close the conduit to the pump and to admit compressed air to the filter side of the valve mechanism for a short time to blow back the clogging material from the filter and strainer to the sea. In a semi-automatic embodiment the valve mechanism is a solenoid operated 3-way valve which is preferably operated from the pilot house for a short interval of about 10 seconds when the boat operator observes an above normal engine temperature. In an automatic embodiment a heat sensor associated with the engine energizes the solenoid circuit when a predetermined above normal temperature is reached and a cycle timer in the circuit controls the solenoid operation through predetermined ON and OFF periods.

5 Claims, 5 Drawing Figures

U.S. Patent
Jul. 10, 1979
4,160,733
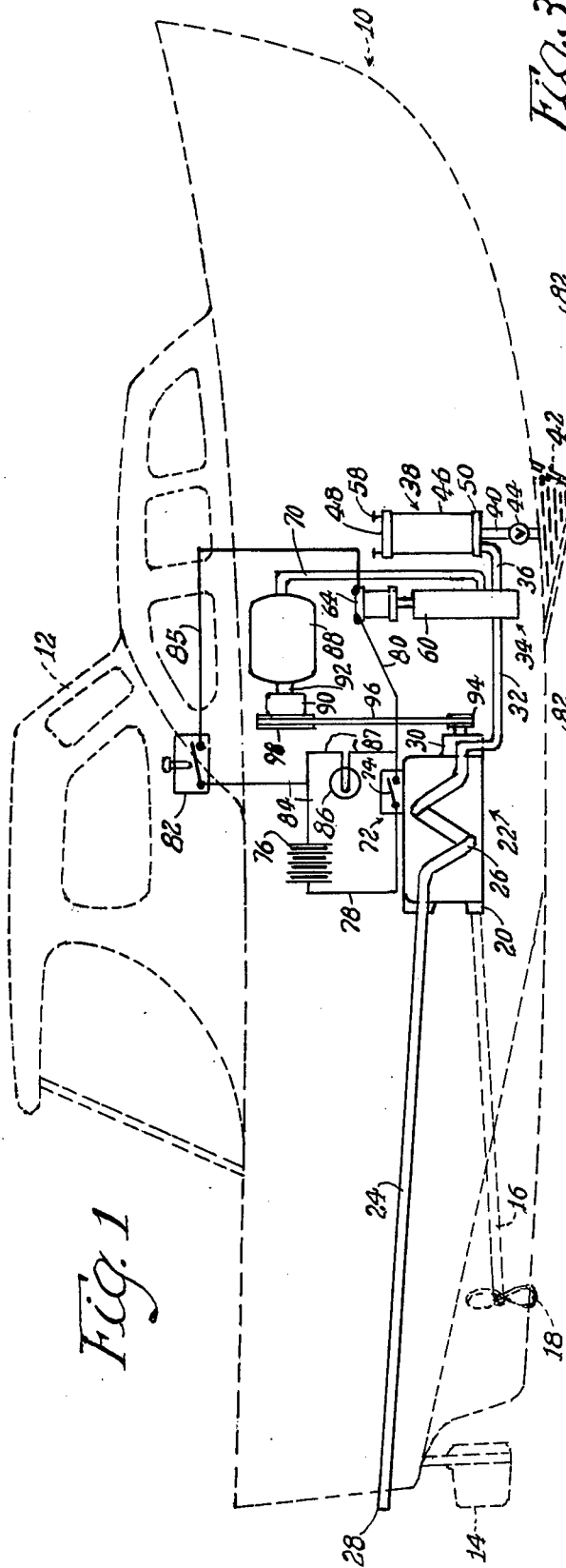
Fig. 1
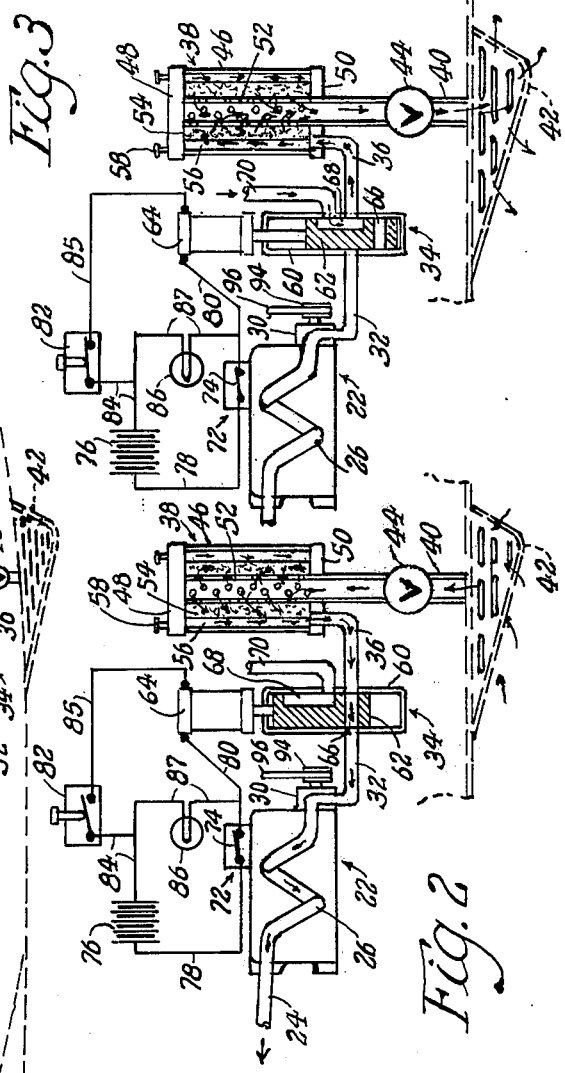
Fig. 2
Fig. 3
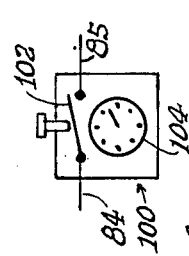
Fig. 4
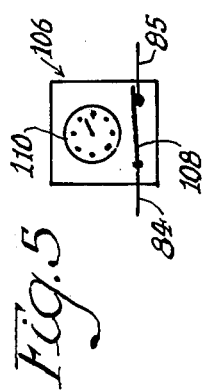
Fig. 5

MARINE ENGINE COOLING WATER FILTER CLEANING SYSTEM

BACKGROUND OF THE INVENTION

This invention relates to internal combustion engines using marine cooling water and more particularily to mechanism for maintaining normal water flow in an intake system having a filter.

Marine craft such as pleasure boats, yachts, fishing boats and other commercial craft using an inboard internal combustion engine for main propulsion and auxiliary purposes, use sea water for cooling the engine. Generally the cooling of the engine is accomplished by pumping the water by means of a pump associated with the engine from an inlet opening in the bottom of the hull through a water inlet conduit, through the engine cooling manifold and thence back to the sea through an exhaust conduit.

Because such craft usually ply river and lake waters having substantial natural weed growth, algae, mud, silt, leaves and the like as well as unnatural debris such as pieces of sheet plastic, rags, paper and the like, it is common practice to provide a relatively coarse strainer at the water inlet opening in the hull to prevent the entry of coarse materials into the intake conduit and further to provide a filter in the water intake conduit between the engine water pump and the filter to prevent the entry of relatively small size materials into the pump and cooling manifold of the engine.

In the typical small boat installation currently in use it is necessary to stop the engine and to manually disassemble the filter unit and clean the filter element manually when the engine overheats due to filter clogging. If the overheating is due to the clogging of the strainer at the hull inlet it is often necessary to clean the strainer from the under side of the boat. In some installations a pair of filters is installed in parallel in the inlet conduit so that the engine may be alternately operated on one of the filters while the other is cleaned manually. It has been proposed to insert a tube in the strainer at the hull and subject it to a fluid blast in response to a partial vacuum condition developed in the water intake conduit due to clogging of the strainer. This approach however, has not been applied to filter cleaning.

SUMMARY OF THE INVENTION

It is the basic object of this invention to provide improved and effective means for clearing both the hull intake strainer and the filter element of clogging debris in a single operation while the engine is running and also when the boat is underway. This is accomplished basically by the provision of a valve mechanism in the cooling water intake conduit between the engine water pump and the filter which is operative to close the water conduit to the engine water pump and to admit compressed air to the filter side of this valve mechanism for a relatively short time interval. The compressed air is admitted in sufficient volume and at sufficient pressure to blow through the filter in a direction opposite the normal water flow and to effectively clear the filter and strainer of clogging materials during this time interval of about 10 seconds or less. The time interval during which the flow of cooling water to the engine is interrupted has no significant adverse effect on the engine. The valve mechanism is preferably actuated when the engine temperature reaches a predetermined elevated level indicating an engine overheated condition.

In the most basic embodiment of the invention, the valve mechanism is actuated manually by the boat operator when he observes the engine to be overheated as indicated by a temperature gauge.

In a practical and economical semi-automatic embodiment the valve mechanism is in the form of a solenoid operated 3-way air-water valve. In its first or normal non-actuated position the valve maintains the normal flow conduit to the engine from the sea. In its second or actuated position, the water flow conduit to the engine is cut off and compressed air is admitted. The solenoid is preferably actuated by a manually operated switch located in the pilot house in response to an alarm or other warning device preferably located in the pilot house and connected to a heat sensor unit associated with the engine. Alternatively, in this embodiment, the manually operated switch includes a timer feature which is operative to actuate the solenoid of the solenoid valve to the second cleaning position for the desired time interval.

In an automatic embodiment the solenoid of the valve is electrically connected to a heat sensor unit having a switch associated with the engine through a repeat cycle timer. The timer is preferably set to have an ON interval of about 10 seconds and an OFF interval of about 2 minutes and is normally in the ON position. When the heat sensor senses a predetermined overheat temp the switch in the heat sensor closes the electrical circuit to the valve solenoid. After 10 seconds the timer opens the circuit for a 2 minute period to permit the engine to regain a temperature below the overheat temperature and hence open the switch in the heat sensor unit. If the engine temperature has not dropped so as to open the heat sensor switch, the timer cycle is automatically repeated.

Other advantages and objects will be apparent from the following drawings and detailed description of the invention.

BRIEF DESCRIPTION OF THE DRAWINGS

FIG. 1 is an elevation view of a boat shown in broken lines having a water cooled engine installation including the water intake system of the invention and the electrical circuitry for operating it.

FIG. 2 is an elevation cross sectional view of the water intake system showing the normal operation water flow path.

FIG. 3 is an elevation cross sectional view of the water intake system showing the water and compressed air path during the filter and strainer cleaning operation.

FIG. 4 is a detail showing the use of a switch and timer for semi-automatic operation.

FIG. 5 is a detail showing the use of a switch and cycle timer for automatic operation.

DETAILED DESCRIPTION OF THE INVENTION

The invention will now be described in terms of a more or less conventional pleasure craft or yacht as shown in FIG. 1 including the usual hull 10, a pilot house 12, the rudder 14, and shaft 16 supported on struts (not shown) connected to the screw 18 on one end and to the transmission 20 of the engine 22 at the other end.

The cooling system of the engine 22 with which this invention is concerned includes an exhaust conduit 24 leading from the cooling manifold 26 of the engine to an exhaust port 28 at the rear end of the boat and an intake conduit which includes a water pump 30 attached to the engine 22, a conduit portion 32 connecting the pump 30 to a valve mechanism 34 which is a feature of this invention, a conduit portion 36 connecting the valve mechanism 34 to a filter unit 38 and the conduit portion 40 connecting the filter unit to a strainer 42 through a valve 44. The strainer 42 is located at the water inlet opening at the bottom of the boat hull and is of a conventional structure having relatively large openings therein capable of restraining relatively large weed masses, plastic sheet fragments and the like.

The filter unit 38, as may best be seen in FIG. 2 includes a cylindrical housing 46 closed at its top by a removable plate 48 held secured thereto by bolts 58 and at its bottom by the plate 50. A perforated concentrically located pipe 52 which preferably forms an extension of the conduit portion 40 and extends to the top plate 48, and a fiberous annular filter element 54 positioned snugly about the perforated pipe 52 and snugly between the top and bottom plates 48 and 50 respectively and in spaced relation to the housing 46 so as to provide an annular unrestricted water flow path 56 therebetween. The filter element 54 may be formed of metallic or other suitable fibers or may be in the form of an annular screen or suitably perforated sheet metal as is well known in the art which is effective to strain from the water the relatively small particles which may otherwise damage the water pump or clog the engine cooling system.

As indicated by the arrows in FIG. 2 the normal water flow is from the sea, through the strainer 42, into the conduit portion 40, into the perforated pipe 52, through the perforations of the pipe 52 and through the filter element 54 and to the annular space 56. From thence the water passes into the conduit portion 36 through the 3-way valve mechanism 34 and to the water pump 30. After passing through the engine cooling manifold 26 the heated water is expelled rearwardly back to the sea through the exhaust conduit 24.

The function of the strainer 42 is to strain out the relatively large debris such as weeds, and the function of the filter 38 is to prevent the relatively small particles from entering the pump and the engine cooling system. As previously mentioned, the filter element 54 eventually becomes clogged so as to seriously reduce the flow rate of cooling water into the cooling manifold of the engine and cause overheating thereof. When this occurs in conventional installation it is necessary to stop the engine, close the valve 44, open the top plate 48 by unscrewing the holding screws 58, remove the filter element 54 and clean or replace it with a clean standby filter. As previously mentioned the need to shut down the engine while at sea has been avoided in some installation by installing a pair of filters in parallel and switching over from one filter to the other when undue clogging occurs. This type of installation has the disadvantage of adding considerable cost to the boat and using much needed space on a small boat. Moreover, in this type of installation the filter must eventually be cleaned as above described.

I have found that the filter element 54 may be cleared of flow restricting debris while the engine is running and while underway without harmful effect on the water pump or engine by closing the conduit 32 to the engine for a short time in the neighborhood of 10 seconds or less and during this time injecting compressed air into the conduit 36 whereby the air and water flow through the filter 54 is reversed as shown by the arrows in FIG. 3 with considerable turbulence and is effective to clear the filter 54 of the clogging materials and further to clear the strainer 42 of clogging material.

In a practical and efficient embodiment which may be characterized as a semi-automatic embodiment the valve mechanism is in the form of a solenoid operated 3-way water air valve 34. As shown in FIG. 2, the valve mechanism 34 includes a cylindrical housing 60 containing a piston 62 mounted for reciprocating movement and connected to a solenoid 64. The piston 62 includes a transverse passage 66 and a longitudinal passage 68. In the non-energized position of the solenoid 64 the piston is in the position shown in FIG. 2 whereby the transverse passage 66 is aligned with the conduits 32 and 36 to form the normal operational water passage through the valve mechanism. In the energized position of the solenoid 64, the piston 62 is moved downwardly to the position shown in FIG. 3 whereby the transverse passage 66 is moved out of alignment with the conduits 32 and 36 to block the conduit 32 and the longitudinal passage 68 connects the air line 70 to the conduit 36 to effect the reverse flow shown by the arrows in FIG. 3.

The engine is provided with a heat sensor unit 72 containing a heat responsive switch 74 which is open at normal operating temperature as for example 160° F. as shown in FIG. 1 and which closes at a predetermined or preset overheat temperature as for example 180° F. as shown in FIGS. 2 and 3.

Referring to FIG. 1 a battery 76 has one terminal connected to one contact of the switch 74 by the lead 78. The contact of switch 74 is connected to one terminal of the solenoid 64 by the lead 80.

The other terminal of the battery 76 is connected to one contact of the push button switch 82 located in the pilot house by the lead 84. The other contact of the switch 82 is connected to the other terminal of the solenoid 64 by the lead 85.

An alarm 86 in the form of a red light, buzzer or the like and preferably located in the pilot house is connected across the leads 84 and 80 by the leads 87. It may readily be seen that when the heat sensor switch 74 is closed, the alarm 86 is actuated, warning the boat operator in the pilot house that the engine is overheating. The switch 82 may then be closed for a predetermined period of time to energize the solenoid 64. As previously indicated, in a first or solenoid non-energized position of the valve mechanism 34, the valve piston 62 connects the water conduit 32 to the water conduit 36 for normal operation. In the second or solenoid energized position the piston or plunger 62 blocks off the conduit 32 and connects the air conduit 70 to the water conduit 36 to establish the rearward and cleaning water and air flow through the filter as shown by the arrows in FIG. 3.

Usually boats of a size of 30 feet or more carry a compressed air tank for operating an air horn and this air source may also be used as an air source for this invention. As shown in FIG. 1, the compressed air tank 88 is maintained in a charged condition by the compressor 90 connected thereto by the conduit 92 and driven by the engine 22 through the pully 94, the belt 96 and the pully 98 in a well known manner.

In operation, when the engine temperature reaches the overheat temperature for example 180° F., the switch 74 in the heat sensor 72 closes and energizes the leads 87 to actuate the alarm 86. The boat operator then closes the manual switch 82 for a brief period up to about 10 seconds. When the switch 82 is closed the circuit to the solenoid 64 is closed to move the 3-way valve to the solenoid actuated or second position to close the conduit 32 to the engine and admit compressed air to the filter unit 38. When the switch 82 is opened the 3-way valve returns to its first position to re-establish water flow to the engine. The heat sensor switch 74 remains closed until the engine temperature drops below the overheat temperature of 180° F. After opening the switch 82, the boat operator should wait for about 2 minutes before attempting to again close the switch 82 for additional cleaning operation since a minute or more of normal water flow may be required to lower the engine temperature after a cleaning operation to cause the heat sensor 72 unit to open the switch 74.

In a variation of the semi-automatic embodiment the manual switch 82 is replaced by a switch-timer unit 100 including the switch 102 and a 10 second timer 104 as shown in FIG. 4. In this variation, the switch 102 is manually closed as before which connects the leads 84 and 85 to energize the circuit to the solenoid 64 and sets into operation, the 10 second timer 104. After 10 seconds, the timer 104 opens the switch 102 associated with the timer to open the circuit to the solenoid 64. Preferably the switch-timer unit 100 used is selected so that the timer is reset each time after the switch 102 is opened.

In the simplest form of the invention, the valve mechanism 38 may be in the form of a first valve (not shown) for opening and closing the conduit portion 32 to the pump and a second valve (not shown) associated with an air conduit leading to the conduit portion 36 for controlling the admission of the compressed air thereto. Each of these are manually operated to establish the filter cleaning operation. Alternatively, these two last mentioned valves may be in the form of a manually operated 3-way air-water valve which is operative to simultaneously close the conduit 32 and admit compressed air to the conduit 36. In this embodiment, the valve mechanism is operated by the boat operator when he observes the engine to be overheating as indicated by a conventional temperature gauge (not shown).

In an automatic embodiment of the invention, the switch 82 of FIG. 2 is replaced by a switch-repeat cycle timer unit 106 including a switch 108 associated with a repeat cycle timer 110 as shown in FIG. 5. In this embodiment, the switch 108 of the unit 106 is normally in a closed position. When the heat sensor 72 senses the overheat temperature of 180° F. the heat sensor switch 74 is closed to actuate the alarm 86 as well as solenoid 64 and to actuate the cycle repeat timer 110. This repeat cycle timer 110 is set to hold the solenoid circuit closed for 10 seconds and then open it for two minutes. If after the 2 minute interval the heat sensor switch 74 is still closed, the cycle described will repeat. If during the two minute off period the engine temperature drops so as to open the heat sensor switch 74, the solenoid circuit is de-energized. Preferably the cycle timer includes means to reset the cycle timer when the heat sensor switch opens.

The switch timer mechanisms described are well known in the electrical control art and are available commercially. Heat sensors as well as solenoid operated 3-way valves of the type described are also well known and available commercially.

It has been found that in an installation where the conduits 32, 36 and 40 have an internal diameter of 1¼ inches, the internal diameter of the filter housing 46 is 4½ inches and the pressure tank 88 is charged to have a pressure of 110 psi, a blow back time of 10 seconds is operative to clear the filter element of clogging material and to re-establish normal water flow in nearly every instance of engine overheating due to filter or strainer clogging. It has also been found that a periodic cleaning operation as part of a preventative maintenance program usually avoids engine overheating occurances. To this end it is desirable in the automatic embodiment to provide electric circuit or mechanical means for actuating the solenoid valve even though the engine is not overheating.

It should be understood that although the use of compressed air to perform the blow back is preferred, other pressurized fluids such as water and steam may be used with suitable obvious modifications.

Although the invention has been described in terms of specific embodiments it will be obvious to those skilled in the art that various changes and modifications may be made within the scope and spirit of the invention.

I claim:

1. A water intake system for supplying an engine having a water pump with marine cooling water comprising, in combination, a water conduit leading from a source of marine water to said pump for normal water flow from said water source to said pump, a strainer disposed at the end of said conduit at said marine water source, a filter in said water conduit in fluid flow relation between said strainer and said pump, a valve means disposed between said filter and said pump, and, a compressed air source and an air conduit leading from said air source to said valve means at an air inlet, said valve means including means to close and open said water conduit to said pump and to open and close said air inlet, said valve means being operative to close said water conduit to said pump when said engine is overheated due to a clogged condition in said filter and/or said strainer and to open said air inlet to said water conduit and said filter so as to admit compressed air to said water conduit and said filter for a short predetermined time to blow back the clogging material out of said filter and strainer to said water source and further being operative to open said water conduit and close said air inlet after said predetermined time.

2. A water intake system for supplying an engine having a water pump with marine cooling water comprising, in combination, a water conduit leading from a source of marine water to said pump for normal water flow from said water source to said pump, a strainer disposed at the end of said conduit at said water source, a filter in said water conduit in fluid flow relation between said strainer and said pump, a three-way air water valve means disposed between said filter and said pump, and a compressed air source and an air conduit leading from said air source to said valve means at an air inlet, said valve means being operative in a first position to provide said water conduit for normal water flow from said strainer through said filter and to said pump, said valve means being operative in a second position to close said water conduit to said pump and to provide an air conduit from said air source through said filter and said strainer in a direction opposite to said normal water flow, said valve means being adapted to be in said first position during normal engine operation conditions and to be in said second position for a short predetermined time when the engine temperature has risen to indicate a clogged filter and/or strainer condition.

3. A water intake system for supplying an engine having a water pump with marine cooling water comprising, in combination, a water conduit leading from a source of marine water to said pump for normal water flow from said water source to said pump, a strainer disposed at the end of said conduit at said water source, a filter in said water conduit in fluid flow relation between said strainer and said pump, a solenoid operated three-way valve means disposed in said conduit between said filter and said pump, a compressed air source and an air conduit leading from said air source to said valve means, said valve means being operative in a first solenoid non-energized position to provide said water conduit for normal water flow from said strainer through said filter and to said pump, said valve means being normally in said first position, said valve means being operative in a second solenoid energized position to close said water conduit to said pump and to provide an air conduit from said air source through said filter to said strainer to blow back filter and strainer clogging debris, a control circuit including an electrical power source connected electrically therein for energizing the same, a first switch responsive to engine temperature and normally in an open position, an alarm electrically connected therein which is energized when said first switch is closed, a manually operated switch electrically connected therein and said solenoid electrically connected therein, said solenoid being energized when first and manually operated switches are both closed and de-energized when one of said switches is open, said first switch being operative to close when said engine reaches a selected predetermined overheat temperature so as to actuate said alarm and condition said circuit to energize said solenoid to said second position when said manually operated switch is closed and to de-energize said solenoid to said first position when said manually operated switch is open.

4. The water intake system defined in claim 3 which includes a timer associated with said manually operated switch which is operative to hold said manually operated switch closed for a selected predetermined short time period up to about 10 seconds when said manually operated switch is manually closed and to open said manually operated switch thereafter.

5. A water intake system for supplying an engine having a water pump with marine cooling water comprising, in combination, a water conduit leading from a source of marine water to said pump for normal water flow from said water source to said pump, a strainer disposed at the end of said conduit at said water source, a filter in said water conduit in fluid flow relation between said strainer and said pump, a solenoid operated three-way valve means disposed in said conduit between said filter and said pump, a compressed air source and an air conduit leading from said air source to said valve means, said valve means being operative in a first solenoid non-energized position to provide said water conduit for normal water flow from said strainer through said filter and to said pump, said valve means being normally in said first position, said valve means being operative in a second solenoid energized position to close said water conduit to said pump and to provide an air conduit from said air source through said filter to said strainer to blow back filter and strainer clogging debris, a control circuit including a battery electrically connected therein for energizing the same, a first switch electrically connected therein, responsive to engine temperature normally in an open position, an alarm electrically connected therein which is energized when said first switch is closed, a second normally closed switch electrically connected therein, and a cycle timer associated with said second switch, said first switch being operative to be closed when the engine reaches a selected predetermined overheat temperature to actuate said alarm and to energize said solenoid to said second position through said second normally closed switch, said cycle timer being operative to maintain a cycle so that said second switch is first in a closed position for a preset period of time up to about 10 seconds and then opened for a longer preset time period sufficient to enable normal water flow through the engine to cool the engine below said overheat temperature and to repeat said cycle as long as said first switch remains closed.

* * * * *